UNITED STATES PATENT OFFICE.

JOHN L. KELLOGG, OF BATTLE CREEK, MICHIGAN, ASSIGNOR TO KELLOGG TOASTED CORN FLAKE CO., OF BATTLE CREEK, MICHIGAN.

COFFEE SUBSTITUTE OR CEREAL COFFEE AND THE PROCESS OF PREPARING THE SAME.

1,059,471.      Specification of Letters Patent.      Patented Apr. 22, 1913.

No Drawing.      Application filed November 4, 1912. Serial No. 729,184.

*To all whom it may concern:*

Be it known that I, JOHN L. KELLOGG, a citizen of the United States, residing at Battle Creek, Michigan, have invented certain new and useful Improvements in Coffee Substitutes or Cereal Coffee and the Process of Preparing the Same, of which the following is a specification.

This invention relates to improvements in coffee substitutes or cereal coffee and the process of preparing the same.

The objects of this invention are to provide an improved coffee substitute and an improved process of preparing the same.

Detailed objects of the invention will appear from the description to follow:

In carrying out my invention it is remarked that the process is applicable either to starch or starchy materials, such as cereals. Whatever the material may be, if it is starch in the lump or a cereal, I reduce the same to a fine flour or powder. To this I add a thick syrup, sixty to eighty per cent. by weight, of such material as maltose, malt extract or New Orleans molasses, or a syrup made from granulated sugar. The syrup should test about 40° Baumé. Of course a greater or smaller quantity of the syrup could be mixed with the starch or starchy material and the density could be more or less, but I find a very good result to follow from the proportions and density indicated.

The starch or starchy material is very thoroughly admixed with the syrup in a mixing machine until the mass is entirely homogeneous. The thoroughly admixed mass is poured into a retort where the same is closed steam tight. The retort is then heated by any suitable means, preferably steam coils, to from 250° to 300° Fahr. and the temperature is maintained from one to five hours, according to the amount of moisture contained in the material and the color which it is desired to obtain. This insures sufficient conversion of the starch and the sugar into dextrin and caramel.

The retort is suddenly thrown open while the heat is still maintained and the mass is thus allowed to quickly cool, and the steam to expand and puff the material. The material will then be found to be in the form of a spongy cake. Owing to the high temperature, the steam almost immediately evaporates and it thus expands the material into a large porous cake, resembling a sponge. The material at this point is sufficiently dry so that it can be removed from the retort and is broken up into fragments ranging in size from the size of a pea to an English walnut. This fragmentary mass is then roasted in a rotary coffee roaster to completely dry the same and to brown the same to any color desired. When the material is thus thoroughly dried and browned, it is reduced to a granular mass or to fine powder, as the case may be, depending on the coarseness of the granules desired. If the mass is pulverized and reduced to an impalpable powder, a cup of cereal coffee can be prepared almost instantly from it. If the granules are coarse a longer steeping is required.

By this process the cooked material is made spongy and very quickly dried, resulting in a great saving of time, and also, because the mass is porous, it is much more readily browned and roasted.

I have indicated that the invention is capable of wide variations, and I desire to claim the same specifically and also broadly, as appears from the appended claims.

Having thus described my invention, what I claim as new and desire to secure by Letters Patent is:

1. The process of preparing a coffee substitute consisting of reducing the starch or starchy material to a powder; admixing the same with about sixty per cent. of its weight with a thick syrup, testing about 40° Baumé; heating the same in a closed retort suddenly to a temperature from 250° to 300° from one to five hours; opening the retort while hot to permit the quick evaporation of the moisture; breaking the mass into fragments; roasting the fragmentary mass of material to drive out the residue of moisture and brown the same; and pulverizing the roasted mass; as specified.

2. The process of preparing a coffee substitute consisting of reducing the starch or starchy material to a powder; admixing the same with a syrup; heating the same in a closed retort to a temperature from 250° to 300° from one to five hours; opening the retort suddenly while hot to permit the quick evaporation of the moisture; breaking the mass into fragments; roasting the fragmentary mass of material to drive out the residue of moisture and brown the same; and pulverizing the roasted mass; as specified.

3. A coffee substitute comprising; an admixture of a starchy material and syrup which has been heated and converted into and expanded into a puffed porous mass; browned and pulverized as specified.

4. A coffee substitute compound comprising dextrinized starch and caramelized sugar expanded to a puffed spongy mass and browned as specified.

In witness whereof, I have hereunto set my hand and seal in the presence of two witnesses.

JOHN L. KELLOGG. [L. S.]

Witnesses:
H. E. RALPH,
A. McCURDY.